(12) United States Patent
Parmenter

(10) Patent No.: US 7,083,821 B1
(45) Date of Patent: Aug. 1, 2006

(54) LOW CARB MOUSSE

(76) Inventor: Deborah A. Parmenter, 1770 Grant Rd., Grant, FL (US) 32949

( * ) Notice: Subject to any disclaimer, the term of this patent is extended or adjusted under 35 U.S.C. 154(b) by 318 days.

(21) Appl. No.: 10/694,298

(22) Filed: Oct. 27, 2003

(51) Int. Cl.
*A23G 1/30* (2006.01)
*A23G 1/32* (2006.01)

(52) U.S. Cl. ............... 426/564; 426/565; 426/570; 426/569; 426/590; 426/593

(58) Field of Classification Search ........... 426/564, 426/565, 570, 569, 590, 593
See application file for complete search history.

(56) References Cited

U.S. PATENT DOCUMENTS

| | | | |
|---|---|---|---|
| 4,208,444 A | 6/1980 | Gilmore et al. | 426/570 |
| 4,587,130 A | 5/1986 | Stauber | 426/564 |
| 4,631,196 A | 12/1986 | Zeller | 426/580 |
| 4,663,176 A | 5/1987 | Arden | 426/565 |
| 4,818,554 A | 4/1989 | Giddey et al. | 426/564 |
| 5,456,936 A | 10/1995 | Toonen | 426/567 |
| 5,853,785 A | 12/1998 | Nayyar et al. | 426/565 |
| 5,869,125 A | 2/1999 | Lynch et al. | 426/603 |
| 5,955,136 A * | 9/1999 | Laaman et al. | 426/569 |
| 5,962,058 A | 10/1999 | Ono et al. | 426/564 |
| 2001/0043980 A1* | 11/2001 | Merrick et al. | 426/613 |
| 2002/0127322 A1 | 9/2002 | Bisperink et al. | 426/570 |

* cited by examiner

*Primary Examiner*—Milton I. Cano
*Assistant Examiner*—Adepeju O. Pearse
(74) *Attorney, Agent, or Firm*—Brian S. Steinberger; Law Offices of Brian S. Steinberger, P.A.

(57) ABSTRACT

Low carbohydrate edible dessert type compositions having net/effective carbohydrates of less than approximately 5 carbs per approximately an 8 ounce serving. The edible compositions can include mousse, chocolate toppings and frostings, and hot chocolate type beverages, all having low carbohydrates while maintaining taste.

19 Claims, 1 Drawing Sheet

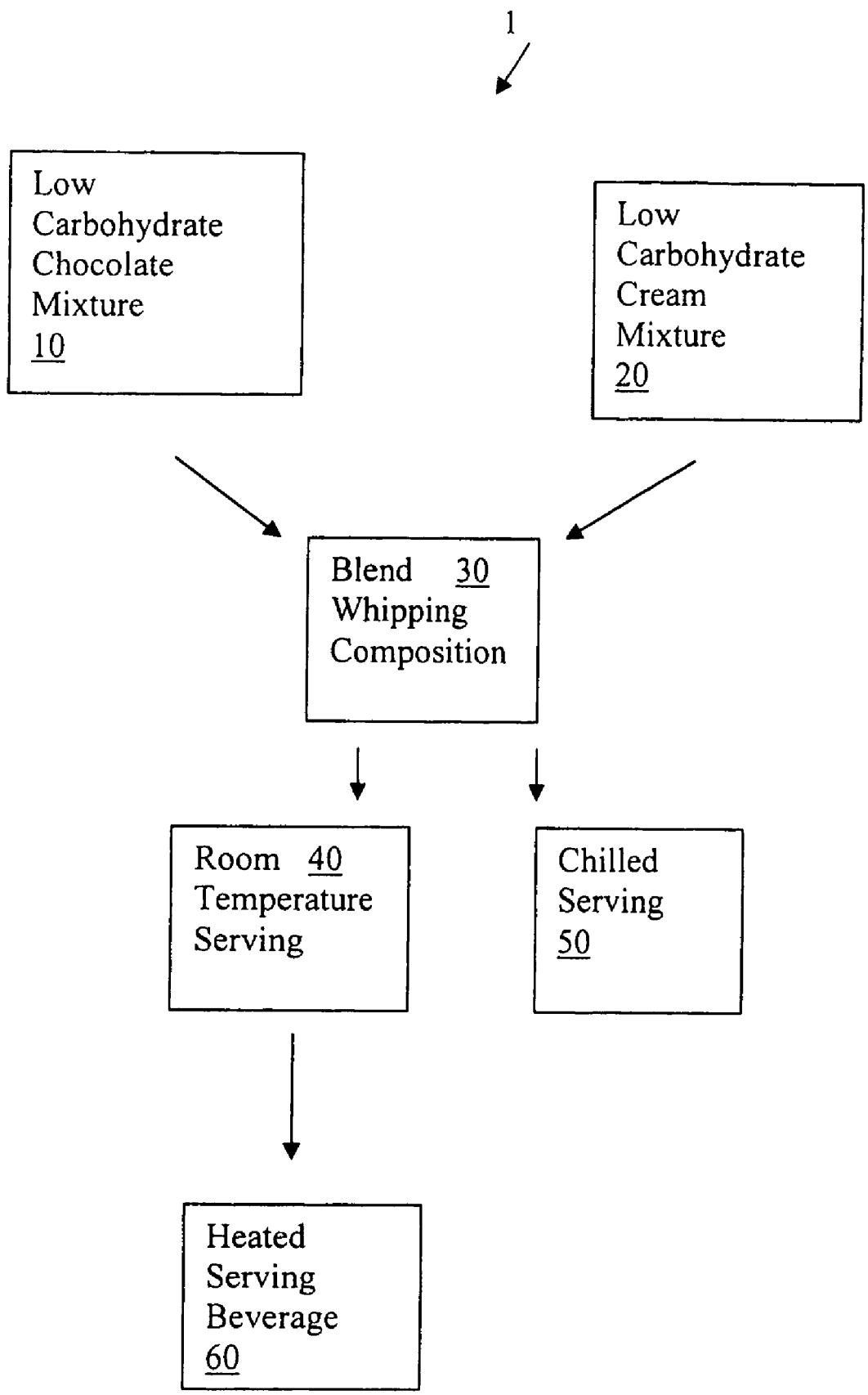

LOW CARB MOUSSE

This invention relates to desserts, creamers, and beverages, in particular to mixtures and methods of making dessert compositions, such as a mousse mix, toppings and frostings, creamers, such as chocolate creamers for coffee, and beverages such as hot chocolate, all with low net carbohydrates.

BACKGROUND AND PRIOR ART

Chocolate mousse, or "mousse" usually encompasses a chilled dessert with a pudding type texture, that retains this texture for a limited amount of time. The generally known traditional processes have included placing chocolate type slabs or cooking chocolate in a warmed liquid, such as water or milk, and stirring the materials until it becomes smooth, and separately adding egg yolks and/or egg whites and/or whipped cream, followed by cooling down the preparation. The steps for preparation usually require a long amount of time, potentially expensive ingredients as well as skill, in order to prepare a "mousse" that is not too liquid or too sticky. Furthermore, the traditional mousse is known to have high amounts of carbohydrates, which make the dessert undesirable for most people who wish to watch their weight.

Dried powder products have been introduced over the years, that allow for cold liquids such as cold milk to be mixed with the dried powder products. The dried powder products have usually consisted of cocoa powder, chocolate powder, sugar and powdered fat, which can also include flavor extracts, emulsifiers, and colorings. These off-the shelf powder products are easier to prepare than the traditional process described above. However, the powdered products have been known to suffer from being poor in sensory quality, which makes them undesirable to be used. In addition, the dried powder products also suffer from having high amounts of calories and carbohydrates, which make the dessert undesirable for most people who wish to watch their weight.

Various patents have been proposed over the years. For example, the inventor is aware of U.S. Pat. No. 4,587,130 to Stauber; U.S. Pat. No. 4,631,196 to Zeller; U.S. Pat. No. 4,663,176 to Arden; U.S. Pat. No. 4,818,554 to Giddey et al.; U.S. Pat. No. 5,456,936 to Toonen; U.S. Pat. No. 5,853,785 to Nayyar et al.; U.S. Pat. No. 5,869,125 to Lynch et al.; U.S. Pat. No. 5,962,058 to Ono et al.; and patent application publication US 2002/0127322 to Bisperink et al. However, none of these patents overcomes all the problems with the prior art described above.

Thus, the need exists for solutions to the above problems with the prior art.

SUMMARY OF THE INVENTION

A primary objective of the present invention is to provide a dessert composition, such as mousse, and a method of making the dessert composition, such as mousse, that is low in carbohydrates compared to traditionally prepared and storebought prepared dessert compositions.

A secondary objective of the present invention is to provide a beverage composition, such as mousse, and a method of making a beverage, such as hot-chocolate, that is low in carbohydrates compared to traditionally prepared and storebought prepared beverage compositions.

A third objective of the present invention is to provide a creamer composition for beverages, and a method of making the creamer composition for beverages, that is low in carbohydrates compared to traditionally prepared and storebought creamer compositions.

A fourth objective of the present invention is to provide a topping composition, such as mousse, and a method of making the topping composition, such as a spread and/or frosting on other foods, and the like, that is low in carbohydrates compared to traditionally prepared and storebought prepared dessert compositions.

Preferred embodiments of the composition and methods of making the composition includes a first mixture having chocolate powder with low carbohydrates, whipped and blended together with a second mixture having cream with low fat and low carbohydrates. An approximately 8 ounce serving of the resulting composition has less than approximately 5 net carbohydrates (and preferably less than approximately 2 net carbs), which would include sugar and starch type carbohydrates.

The first mixture can be approximately teaspoon of a pre-blended mixture a pre-blended mixture of maltitol, non-hydrogenated vegetable oil, low fat cocoa powder, milk proteins, soy flour, soy lecithin, and vanilla The second mixture can be approximately half a cup of a pre-blended mixture of heavy cream, carrageenan, vegetable mono and diglycerides, and polysorbate 80.

The edible product can be served at room temperature or chilled as chocolate mousse.

Different serving amounts of the edible product can be used as a topping or frosting on other desserts, and the like.

Another version of the edible product can include water being added to form a chocolate beverage. Heating the resulting product can result in hot chocolate.

Further objects and advantages of this invention will be apparent from the following detailed description of the presently preferred embodiments which are illustrated schematically in the accompanying drawings.

BRIEF DESCRIPTION OF THE FIGURE

FIG. 1 is a flow chart showing the method of making the edible composition for use as a room temperature serving, a chilled serving, and as a heated beverage.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In a first embodiment, two pre-blended mixtures can be combined together to form an edible composition.

The first pre-blended mixture can include approximately one teaspoon of: Ingredients from Table 1.

TABLE 1

| | Approx. Amount per serving |
|---|---|
| 1. Maltitol | 9 g |
| 2. Vegetable oil (non-hydrogenated) | <1 g |
| 3. Low fat cocoa powder | <1 g |
| 4. milk proteins | 1.5 g |
| 5. Soy flour | <1 g |
| 6. Soy lecithin | <1 g |
| 7. Vanilla | <1 g |

The pre-mixture combination in Table 1 in a single serving can have a total carbohydrates of approximately 10 g, with effective carbs (net carbs of sugars and starch) of less than approximately 1 g. Net carbs or effective carbs have an impact on blood sugar levels. Total fat calories per serving can be approximately 60. The ingredients of from Table 1, can be found in a pre-mixture such as but not limited to a product entitled Sugar Free Twist, Real Dutch Chocolate spread, produced in Holland by Bernard Brinkers B.V.

The first pre-mixture can be in a powder form, or a liquid form or a paste form.

The second pre-blended mixture can include a serving of approximately a half cup of: Ingredients from Table 2.

TABLE 2

|   | Amounts per serving |
|---|---|
| 1. Heavy Cream | <1 g |
| 2. Carrageenan | <1 g |
| 3. Vegateble Mono | <1 g |
| 4. Diglycerides | <1 g |
| 3. Polysorbate 80. | <1 g |

The ingredients of from Table 2, can be found in a pre-mixture such as but not limited to a brand entitled: Publix Heavy Whipping Cream, Ultra-Pasteurized, sold in half pints. A serving of approximately ½ cup would have total carbohydrates of approximately 0 g, and 0 g of sugar, and total fat of approximately 5 g. The second pre-mixture can be in a pre-chilled liquid form.

The first pre-blended mixture and the second pre-blended mixture can be combined together by whipping and blending together using one of the various types of whipping techniques disclosed in anyone of the patents in the prior art, such as but not limited to U.S. Pat. No. 4,663,176 to Arden, and U.S. Pat. No. 4,587,130 to Stauber, which are both incorporated by reference, until a silky type mousse mixture has been achieved. The whipping and blending step for one serving of approximately 8 ounces can take up to approximately 8 minutes, and can be done at room temperature.

The resulting composition from the above, can form a single serving of approximately 8 ounces having net carbohydrates of less than approximately 5 net carbohydrates, and preferably less than approximately 2 net carbs (effective carbs). The net carbohydrates are considered to be effective carbohydrates which can effect metabolism, and can include sugars and starch, which have been known by the Atkins, Diet, to have significance in weight loss, and maintaining existing weight. The net carbohydrates have also been found to be approximately 2 net carbohydrates.

The resulting composition can be chilled or frozen as described in previous patents such as U.S. Pat. No. 4,663, 176 to Arden, and U.S. Pat. No. 4,587,130 to Stauber, which are both incorporated by reference, and be used as a low carbohydrate dessert, such as chocolate mousse.

Additionally, the resulting composition can be used in various sized servings, and served room temperature state or in a chilled state, as a low carbohydrate topping and/or frosting and/or dessert spread for desserts, such as topping on cake, a topping on cookies, and the like.

Still furthermore, the resulting composition can be used in smaller servings, such as a teaspoon, and the like, and served at room temperature or in a chilled state, as a low-carbohydrate creamer for beverages, such as coffee, espresso, cappuccino, and the like.

Another embodiment allows for adding water to the whipping and blending step of combining the first mixture and the second mixture in varying amounts such as but not limited to approximately one part water for approximately two parts composition to form a chocolate beverage, and the like. The beverage can additionally, be heated to further form a hot beverage such as hot chocolate, and the like. Still furthermore, additional products can be combined into the beverage, such as but not limited to liquors, liqueurs, and the like, as desired.

FIG. 1 is a flow chart 1 showing the method of making the edible composition 30 from a pre-mixture of a low carbohydrate chocolate mixture 10, and a pre-mixture of a low-carbohydrate cream mixture 20, which is blended and whipped together 30, and served at room temperature 40, in a chilled state 50, and/or as a heated beverage 60.

Still furthermore, the invention can be used with other edible foods, such as but not limited to meal and snack bars, and the like.

Although dark type chocolate is referenced above, the invention can be made with other types of flavoring, such as but not limited to white chocolate, milk chocolate, vanilla, and the like, hazelnut, almond, raspberry, strawberry, and the like, and combinations thereof.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A composition for making an edible product, comprising:
   an approximate single teaspoon of a first mixture having chocolate powder with low fat and low carbohydrates, the first mixture consisting of a first pre-blended mixture of maltitol, non-hydrogenated vegetable oil, low fat cocoa powder, milk proteins, soy flour, soy lecithin, and vanilla; and
   an approximate single half cup of a second mixture having cream with low carbohydrates, the second mixture consisting of a second pre-blended mixture of heavy cream, carrageenan, vegetable mono, and diglycerides, and polysorbate 80, the composition being a combination of the first mixture and the second mixture, whereby a serving of the composition has less than approximately 10 g of total carbohydrates and less than approximately 1 g of effective carbs (net carbs of sugars and starches).

2. The composition of claim 1, wherein the serving includes: approximately 8 ounces.

3. The composition of claim 1, wherein the edible product is: chocolate mousse.

4. The composition of claim 1, further comprising:
   water added to the first mixture and the second mixture to form a chocolate beverage.

5. The composition of claim 4, whereby the beverage is: hot chocolate.

6. The composition of claim 1, wherein the edible product is: a chocolate creamer.

7. The composition of claim 1, wherein the edible product is: a dessert.

8. The composition of claim 1, wherein the mixture of the first pre-blended mixture and the second pre-blended mixture includes:

a whipped mixture of the first pre-blended mixture and the second pre-blended mixture, wherein the whipped mixture forms the composition.

9. The composition of claim 1, wherein the mixture of the first pre-blended mixture and the second pre-blended mixture includes:
a blended mixture of the first pre-blended mixture and the second pre-blended mixture, wherein the blended mixture forms the composition.

10. The composition of claim 1, wherein the mixture of the first pre-blended mixture and the second pre-blended mixture includes: a whipped and blended mixture of the first pre-blended mixture and the second pre-blended mixture, wherein the whipped and blended mixture forms the composition.

11. The composition of claim 1, wherein the first pre-blended mixture includes: approximately 9 g of maltitol, less than approximately 1 g of non-hydrogenated vegetable oil, less than approximately 1 g of low fat cocoa powder, approximately 1.5 g of milk proteins, less than approximately 1 g of soy flour, less than approximately 1 g of soy lecithin, and less than approximately 1 g of vanilla.

12. The composition of claim 1, wherein the second pre-blended mixture includes: less than approximately 1 g of heavy cream, less than approximately 1 g of carrageenan, less than approximately 1 g of vegetable mono, less than approximately 1 g of diglycerides, and less than approximately 1 g of polysorbate 80.

13. A composition for making an edible product comprising: a first mixture having chocolate powder with low fat and low carbohydrates, the first mixture consisting of a first pre-blended mixture of approximately 9 g of maltitol, less than approximately 1 g of non-hydrogenated vegetable oil, les than approximately 1 g of low fat cocoa powder, approximately 1.5 g of milk proteins, less than approximately 1 g of soy flour, less than approximately 1 g of soy lecithin, and less than approximately 1 g of vanilla; and a second mixture having cream with low carbohydrates, the second mixture consisting of a second pre-blended mixture of less than approximately 1 g of heavy cream, less than approximately 1 g of carrageenan, less than approximately 1 g of vegetable mono, less than approximately 1 g of diglycerides, and less than approximately 1 g of polysorbate 80, the composition being a combination of the first mixture and the second mixture, whereby a serving of the composition has less than approximately 10 g of total carbohydrates and less than approximately 1 g of effective carbs (net carbs of sugars and starches).

14. The composition of claim 13, wherein the first mixture includes:
an approximate single teaspoon size of the first pre-blended mixture.

15. The composition of claim 13, wherein the second mixture includes:
an approximate single half cup size of the second pre-blended mixture.

16. The composition of claim 13, wherein the first mixture includes an approximate single teaspoon size of the first pre-blended mixture, and the second mixture includes an approximate single half cup size of the second pre-blended mixture.

17. The composition of claim 13, wherein the mixture of the first pre-blended mixture and the second pre-blended mixture includes:
a whipped mixture of the first pre-blended mixture and the second pre-blended mixture, wherein the whipped mixture forms the composition.

18. The composition of claim 13, wherein the mixture of the first pre-blended mixture and the second pre-blended mixture includes: a blended mixture of the first pre-blended mixture and the second pre-blended mixture, wherein the blended mixture forms the composition.

19. The composition of claim 13, wherein the mixture of the first pre-blended mixture and the second pre-blended mixture includes:
a whipped and blended mixture of the first pre-blended mixture and the second pre-blended mixture, wherein the whipped and blended mixture forms the composition.

* * * * *